(12) United States Patent
Schüler et al.

(10) Patent No.: US 7,631,578 B2
(45) Date of Patent: Dec. 15, 2009

(54) GEAR STAGE OF AN ACTUATING DRIVE

(75) Inventors: Rolf Schüler, Heiligenhaus (DE); Karsten Kalmus, Bochum (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/214,664

(22) Filed: Jun. 20, 2008

(65) Prior Publication Data

US 2009/0005207 A1  Jan. 1, 2009

Related U.S. Application Data

(63) Continuation of application No. PCT/EP2006/011881, filed on Dec. 9, 2006.

(30) Foreign Application Priority Data

Dec. 21, 2005 (DE) .................. 10 2005 061 188

(51) Int. Cl.
*F16H 37/06* (2006.01)

(52) U.S. Cl. ........................... 74/721; 74/640

(58) Field of Classification Search ............... 475/149, 475/162, 163, 165, 168, 170, 177; 74/640, 74/721, 412 TA
See application file for complete search history.

(56) References Cited

U.S. PATENT DOCUMENTS

| 5,634,689 | A | 6/1997 | Putsch et al. |
| 6,652,406 | B2 * | 11/2003 | Yamashita .................. 475/169 |
| 2004/0248688 | A1 * | 12/2004 | Shimada ..................... 475/159 |
| 2008/0146394 | A1 * | 6/2008 | Schuler et al. .............. 475/162 |

FOREIGN PATENT DOCUMENTS

| DE | 44 36 101 A1 | 6/1995 |
| WO | WO 96/05451 | 2/1996 |
| WO | WO 96/17187 | 6/1996 |
| WO | WO 00/39483 | 7/2000 |
| WO | WO 2004071771 A1 * | 8/2004 |

* cited by examiner

*Primary Examiner*—David D Le
(74) *Attorney, Agent, or Firm*—Womble Carlyle Sandridge & Rice, PLLC

(57) ABSTRACT

In the case of a gear stage (1) of an actuating drive, in particular for a vehicle seat, having a bearing (12) which defines an axis (A12) and having an oscillatory body (11) which is mounted in a rotatable manner by the bearing (12), defines a further axis (A11) and, upon rotation of a driving mechanism (21), executes a rolling movement on the bearing (12), the axis (A11) of the oscillatory body (11) is inclined obliquely at an angle ($\alpha$) relative to the axis (A12) of the bearing (12).

22 Claims, 4 Drawing Sheets

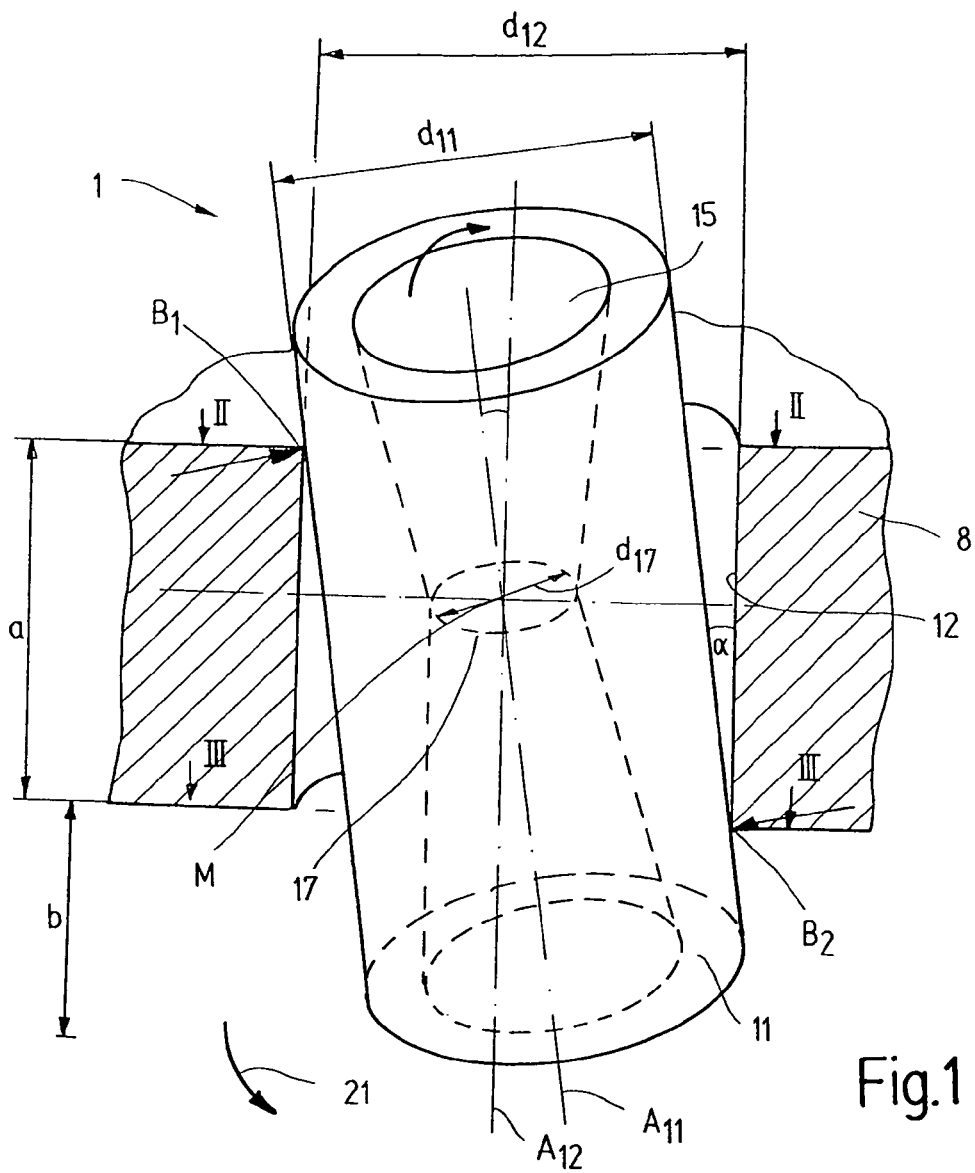
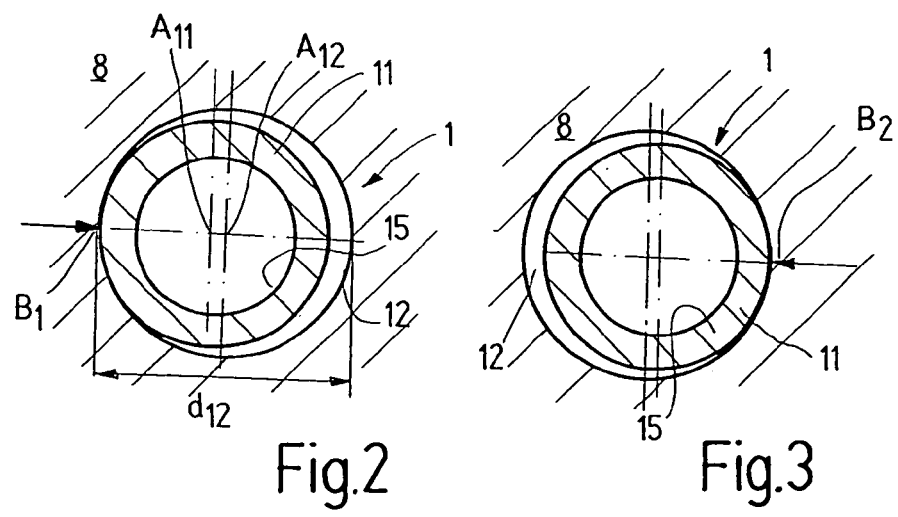
Fig.1
Fig.2  Fig.3

GEAR STAGE OF AN ACTUATING DRIVE

CROSS-REFERENCE TO RELATED APPLICATION

The present application is a continuation of International Application PCT/EP2006/011881, which was filed Dec. 9, 2006. The entire disclosure of International Application PCT/EP2006/011881, which was filed Dec. 9, 2006, is incorporated herein by reference.

TECHNICAL FIELD

The present invention relates to a gear stage of an actuating drive, in particular for a vehicle seat, with the gear stage including a bearing, which defines an axis, and an oscillatory body, which defines another axis, with the oscillatory body being mounted for rolling on the bearing in response to rotation of a driving mechanism, so that the oscillatory body rotates around the axes during the rolling of the oscillatory body on the bearing.

BACKGROUND OF THE INVENTION

DE 44 36 101 A1 discloses a gear stage of the type described above in the Technical Field section of this disclosure, with the gear stage being implemented in a fitting with two toothed articulated parts which mesh with one another. A first of the two articulated parts forms a fixed bearing, while a second of the two articulated parts serves as an oscillatory body that bears against the first articulated part at a single contact point and, in driving operation, executes a rolling movement which constitutes a rotational movement about an axis parallel to and circulating around the axis of the first articulated part/bearing.

BRIEF SUMMARY OF SOME ASPECTS OF THE INVENTION

An aspect of the present invention is the provision of an alternative gear stage that is generally of the type mentioned in the Technical Field section of this disclosure. In accordance with one aspect of the present invention, a gear stage of an actuating drive, in particular for a vehicle seat, comprises a bearing defining an axis, and an oscillatory body defining an axis. The oscillatory body is mounted for rolling on the bearing in response to rotation of a driving mechanism, so that the oscillatory body rotates around the axes during the rolling of the oscillatory body on the bearing. The axis of the oscillatory body is inclined obliquely to the axis of the bearing.

Because the axis of the oscillatory body is inclined obliquely relative to the axis of the bearing, a different ratio between the installation space required in the radial direction and in the axial direction can be set. Preferably, symmetrical relationships of forces are also generated, in that twice as many contact points with normal forces diametrically opposing one another are provided. As compared to a simple doubling of the components of the gear stage, rotation through 180° and an axially offset arrangement, significantly fewer components are required for the exemplary embodiment of the present invention. For simple kinematics, the two axes intersect at one point. Further simplifications of the geometrical relationships are achieved, for example, by configuration of the oscillatory body and the bearing—both at least zonally—in a cylindrically symmetrical manner with different diameters. The oscillatory body and bearing may cooperate as a friction gear or by way of a toothing.

The output drive is preferably effected concentrically with the axis of the bearing. For this purpose, the oscillatory body has a conical receptacle for the output drive. The output drive is preferably provided as a shaft in contact with the receptacle. The aperture angle of the receptacle is selected according to the inclination of the oscillatory body, so that the output drive can rotate about the axis of the bearing. A contact circle with a center provided at the narrowest point of the receptacle is then permanently in contact with the output drive. This center, which preferably is at the same time the point of intersection of the axes of the oscillatory body and the bearing, may be arranged, for example, midway between the contact points, facilitating the formation of symmetrical relationships of force.

The driving mechanism of the oscillatory body may be effected, for example, by way of a rolling eccentric which is generated by a circulatory rolling eccentric ball. The spherical shape (of the ball) again permits compensation of the inclination of the oscillatory body, so that a drive concentric with the axis of the bearing is possible. However, it is also possible that a motor of the actuating drive is so closely integrated with the gear stage that the oscillatory body may directly carry rotor magnets of the motor, while a stator cooperating with the rotor magnets and preferably commutated electronically is arranged on the bearing or on a housing containing the bearing. Compensation of the effects of the inclination of the oscillatory body is then effected, for example, by the locally varying, in particular axially varying, commutation of the stator.

The actuating drive provided with the gear stage according to the exemplary embodiment of the invention is used in a vehicle seat, preferably in combination with a load-absorbing transmission of a fitting, as a backrest inclination adjuster, but might also be used elsewhere in a vehicle seat.

Other aspects and advantages of the present invention will become apparent from the following.

BRIEF DESCRIPTION OF THE DRAWINGS

The present invention is explained in more detail below with reference to an exemplary embodiment and a modification, which are represented in the drawings, in which:

FIG. 1 is a basic diagram of the exemplary embodiment,

FIG. 2 shows a section along the line II-II in FIG. 1,

FIG. 3 shows a section along the line III-III in FIG. 1,

DETAILED DESCRIPTION

Figure 5:
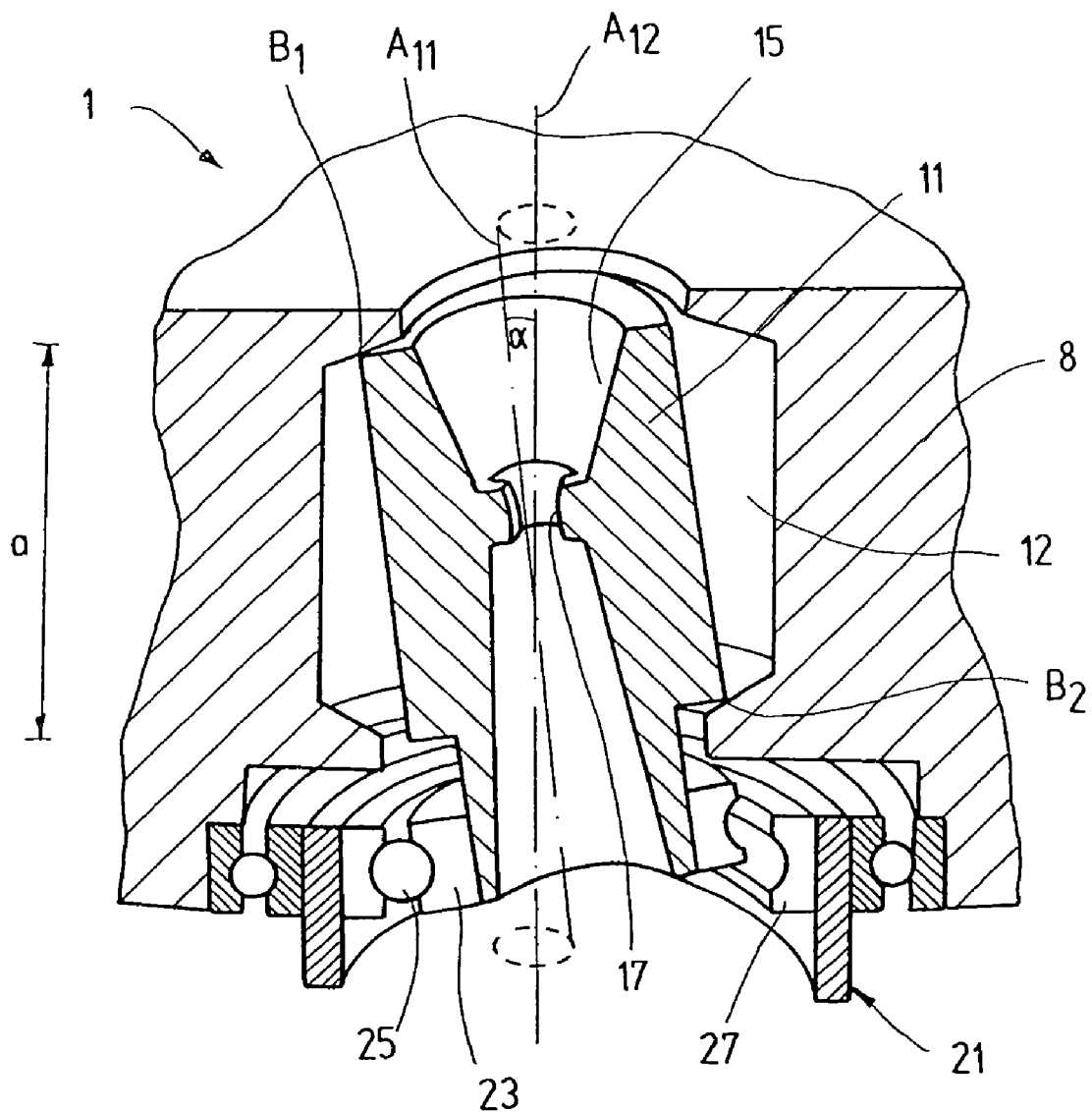
FIG. 5 is a representation of the exemplary embodiment with a driving mechanism.
Figure 4:
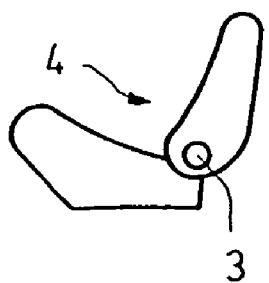
FIG. 4 is a schematic representation of a driver's seat.

A gear stage 1 of an actuating drive 3 in a vehicle seat 4 of a motor vehicle has a fixed housing 8 (that is, a housing 8 connected to the structure of the vehicle seat 4) and an oscillatory body 11. The oscillatory body 11 is enclosed at least partially by the housing 8 and is mounted rotatably inside the housing 8 in a bearing 12.

The operating principle of the gear stage 1 can be understood with reference to FIG. 1. The oscillatory body 11 is—at least zonally—cylindrically symmetrical (e.g., at least a portion of the oscillatory body 11 is cylindrically symmetrical), with the (external) diameter $d_{11}$ of this cylinder being smaller than the (internal) diameter $d_{12}$ of the bearing 12, which is also cylindrically symmetrical (e.g., at least a portion of the bearing 12 is cylindrically symmetrical), in accordance with the exemplary embodiment. The symmetries of the oscillatory body 11 and of the bearing 12 respectively define an axis $A_{11}$ and an axis $A_{12}$. The axis $A_{11}$ of the oscillatory body 11 is inclined at a non-zero angle a relative to the axis $A_{12}$ of the bearing 12. That is, the axis $A_{11}$ is oblique with respect to the axis $A_{12}$. In the exemplary embodiment, the bearing 12 extends for a length a along the bearing's axis $A_{12}$, with the oscillatory body 11, which extends beyond the bearing 12, respectively resting (e.g., engaging) against the edges of the bearing 12 at a first contact point $B_1$ and at a diametrically opposite, second contact point $B_2$, and otherwise projecting into the housing 8 or extending beyond the housing 8, wherein $d_{12}=d_{11}/\cos \alpha + a \tan \alpha$ applies.

The oscillatory body 11 is driven by a motive force (e.g., driving mechanism) at an end projecting beyond the bearing 12. The motive force engages on the outside of the oscillatory body 11, whereby the oppositely directed normal or radial forces are also generated at the contact points $B_1$, $B_2$ The motive force has a circulatory direction, so that the contact points $B_1$, $B_2$ circulate and the oscillatory body 11 therefore rotates or, more precisely, rolls on the bearing 12. As the oscillatory body 11 rolls on the bearing 12, the axis $A_{11}$ of the oscillatory body 11 moves on a conical surface about the axis $A_{12}$ of the bearing 12. In a plane perpendicular to the axis $A_{12}$ of the bearing 12, the rolling motion of the oscillatory body 11 is exhibited as a rotary motion with a superposed wobbling motion, that is, with a rotating eccentricity that is $(d_{12}-d_{11}/\cos \alpha)/2$, that is, with a small angle of inclination $\alpha$ that is approximately $(d_{12}-d_{11})/2$. This eccentricity is small in relation to the diameters $d_{11}$ and $d_{12}$, preferably in the range of not more than a few percent, that is, as a rule (e.g., typically) the eccentricity is less than 0.5 mm.

Figure 8:
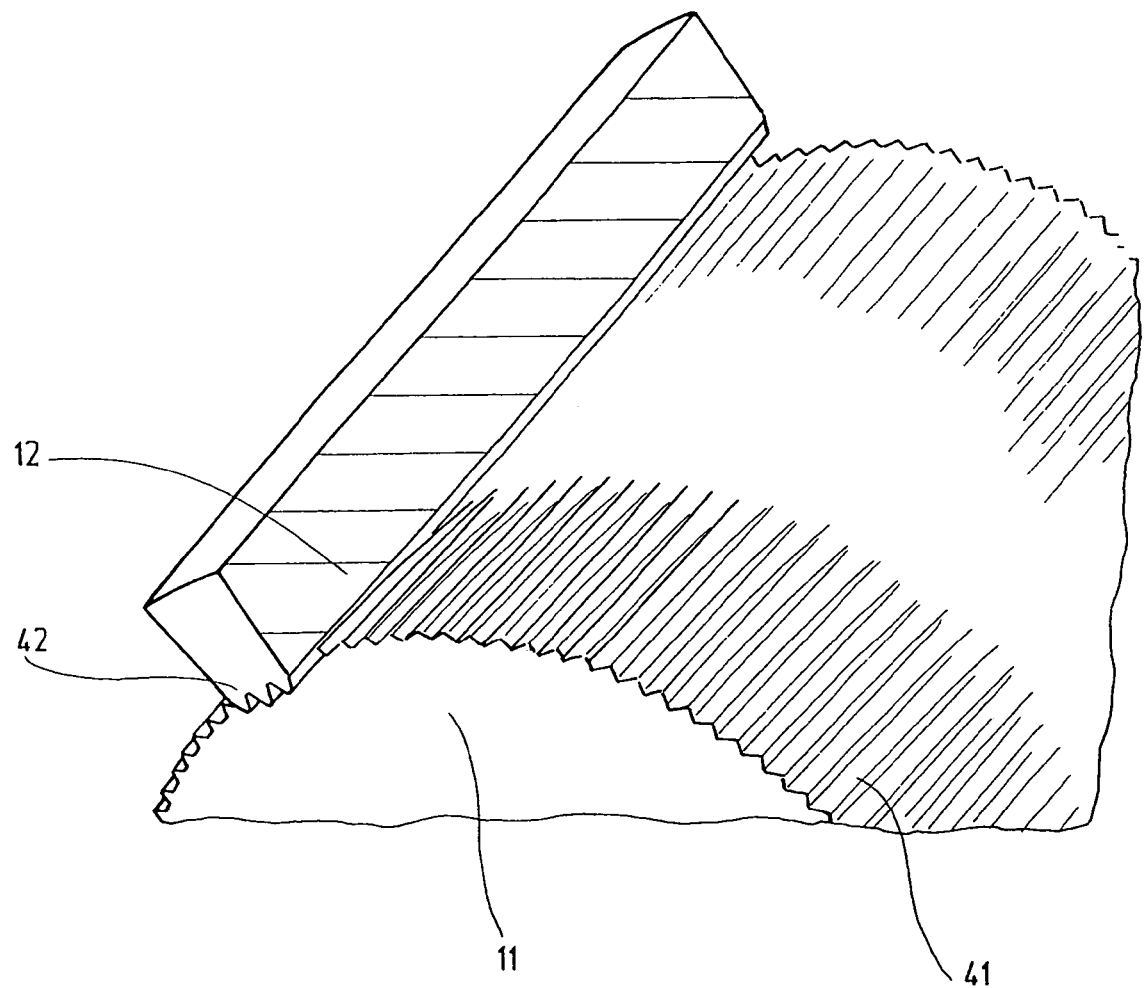
FIG. 8 shows a toothing between the oscillatory body and the bearing (only partially shown).

In order to generate with the normal forces a friction as high as possible for the rolling movement between oscillatory body 11 and bearing 12 at the contact points $B_1$, $B_2$, the material pairings are selected suitably, and optionally surface coatings are provided and/or suitable contact geometries are realized, for example, rings in V-shaped annular grooves or a toothing, as shown in FIG. 8, which is described in more detail below. The radial forces at the contact points $B_1$, $B_2$ increase additionally if the area of engagement of the motive force is spaced from the bearing 12 at a distance which is large in comparison to the length of the bearing 12.

The oscillatory body 11 is provided with a double-conical internal bore, referred to hereinafter as the receptacle 15, the aperture angle of which is $2\alpha$. At its narrowest point, the receptacle 15 has a cross section in the form of a contact circle 17 with a center M and a diameter $d_{17}$. The center M is at the same time the point of intersection of the axes $A_{11}$, $A_{12}$. In FIG. 1 the oscillatory body 11 is arranged such that the center M comes to lie midway between the contact points $B_1$, $B_{12}$, and therefore at a/2 along the axis $A_{12}$ of the bearing 12. This midway arrangement is not absolutely essential, but has the advantage of being located at the center of gravity and thus of reducing inertia forces.

As the output drive, a shaft with the contact circle 17 as its cross section is inserted in the oscillatory body 11. The shaft then lies contiguously adjacent to (e.g., abuts) the wall of the receptacle 15 and is entrained upon (the shaft rotates in response to) rotation of the oscillatory body 11. That is, the oscillatory body 11, when rotating, rotates the shaft. Because the aperture angle of the receptacle 15 compensates for the inclination of the axis $A_{11}$ of the oscillatory body 11, and because the local eccentricity at the center M is zero (and is very small in the plane of the contact circle 17), the shaft can rotate about the axis $A_{12}$ of the bearing 12 without wobbling deviations from a rotary motion being appreciable. The transmission ratio between the (relatively low) rotational speed of this shaft and the (relatively high) rotational speed of the motive force (e.g., driving mechanism) is approximately $d_{12}/(d_{12}-d_{11})$. To improve the contact between oscillatory body 11 and shaft, a particular contact geometry, for example a parabolic tooth contour, may be provided at the contact circle 17.

FIG. 5 illustrates in an exemplary manner how the motive force for the gear stage 1 is exerted by way of a suitable driving mechanism 21, in according with the exemplary embodiment of the invention. As compared to FIG. 1, the bearing 12 is supplemented by oblique-walled end sections, that is, truncated cones, to which the oscillatory body 11 lies contiguously adjacent (e.g., abuts). The oscillatory body 11 is prolonged axially at one end by a cylindrical section of smaller diameter on which the oscillatory body 11 carries an inner bearing race 23 for half-supporting a single rolling eccentric ball 25. The rolling eccentric ball 25 is also half-supported in an outer bearing race 27 on the driving mechanism 21. The driving mechanism 21 is in turn supported in the housing 8, for example by way of a ball bearing. The rolling eccentric ball 25 forms a rolling eccentric and thus applies a twisting load to the oscillatory body 11 and the driving mechanism 21 with respect to one another in such a way that rotation of the driving mechanism 21 causes the desired rolling motion of the oscillatory body 11 on the bearing 12 by way of circulatory rolling of the rolling eccentric ball 25.

Figure 6:
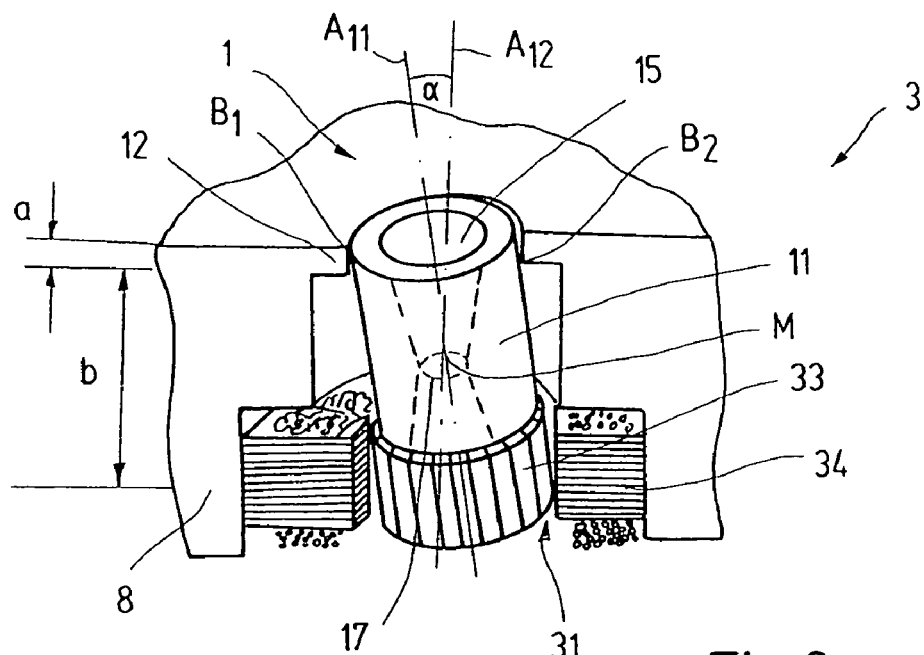
FIG. 6 is a partially schematized representation of an actuating drive that includes the exemplary embodiment.

An actuating drive 3 in which the inventive gear stage 1 and a motor 31 are integrated is shown in FIG. 6, the components of the gear stage 1 described so far, including the installation of the oscillatory body 11 on the bearing 12, being represented only schematically. To form the motor 31, the oscillatory body 11 has at one end a plurality of rotor magnets 33 uniformly distributed in the circumferential direction, and therefore the combination of the oscillatory body 11 and the rotor magnets 33 constitutes the rotor, while a stator 34 is arranged on the housing 8 adjacently to the rotor magnets 33. The circulatory radial forces at the contact points $B_1$, $B_2$, and therefore the tilting moment for the oscillatory body 11, are generated electromagnetically by the motor 31. The stator 34, which cooperates with the rotor magnets 33, is electronically commutated in the present example. In this case, in the absence of compensation for inclination of the driving mechanism 21, an axially varying commutation is in principle possible, in particular in combination with planes, axially offset to one another, which have varying radial magnetization of the rotor magnets 33. This axially varying commutation is coordinated with the desired inclination of the oscillatory body 11 and thus compensates the effect of the inclination thereof during operation of the motor 31.

Figure 7:
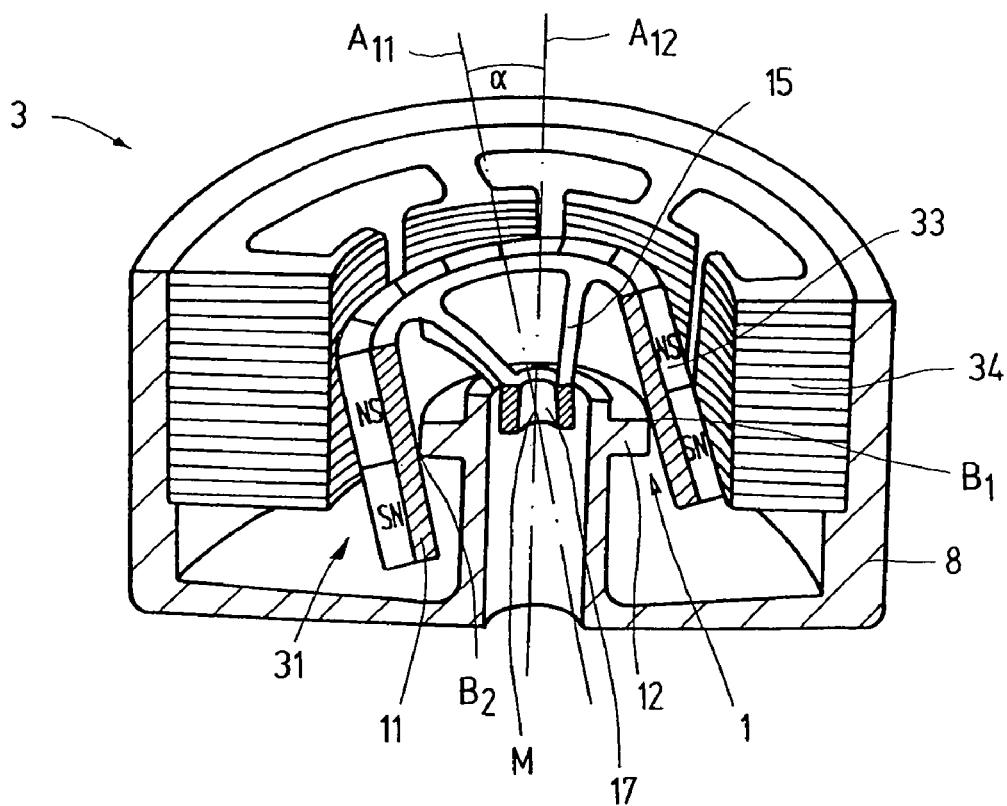
FIG. 7 shows a modification of the exemplary embodiment.

A modification of the exemplary embodiment which—apart from deviations described—coincides with the exemplary embodiment, is shown in FIG. 7. The oscillatory body 11 of the modified embodiment surrounds the bearing 12, that is, $d_{11}>d_{12}$, and lies contiguously adjacent to (e.g., abuts) the bearing 12. In the region of the contact points $B_1$, $B_2$, the bearing 12 is in the form of a disk with a hollow-cylindrical section. The interior of a conical portion of the oscillatory body 11 forms the receptacle 15, including the contact circle 17. The a conical portion, which forms the receptacle 15, including the contact circle 17, may be formed by reverse drawing material of the oscillatory body 11. The receptacle 15 cooperates with (e.g., receives) the shaft serving as the output drive. The internal bearing of the oscillatory body 11 makes it possible to distribute the rotor magnets 33 over the outside of the oscillatory body 11, so that the oscillatory body 11 is made smaller, and finally the whole actuating drive 3 may be axially shorter.

In both the exemplary embodiment and the modification, the oscillatory body 11 and the bearing 12 cooperate at the contact points $B_1$, $B_2$ in the simplest case as a friction gear, that is, with contiguously adjacent (e.g., abutting) smooth surfaces. But as already briefly mentioned, other suitable contact geometries are also possible, preferably a toothing between the oscillatory body 11 and bearing 12. As shown in FIG. 8, the oscillatory body 11 has an external toothing 41 and the bearing 12 (only a small angular portion of which is shown) has an internal toothing 42, which mesh with one another. In the modification in FIG. 7, inverse relationships would be present. In the formula specified for the toothing, the difference of the pitch circles of external toothing 41 and internal toothing 42 would have to be taken additionally into account with respect to $d_{11}$ and $d_{12}$. This also yields a minimum eccentricity required in order to ensure a sufficient engagement of teeth.

The ratio of the diameters of the pitch circles of the external toothing 41 and the internal toothing 42 must correspond to the ratio of the integral numbers of teeth of external toothing 41 and internal toothing 42. The transmission ratio is the ratio of the number of teeth of the external toothing 41 to the difference in the numbers of teeth of the internal toothing 42 and the external toothing 41, and is therefore especially large when the difference in the numbers of teeth is one.

The internal toothing 42 is formed, for example, uniformly over the full length of the bearing 12, in particular with a constant tooth height. In the case of the external toothing 41, the tooth heights are then adapted to the angle of inclination α. The geometrical generation of the external toothing 41 is effected by kinematic rolling in contact of the pitch circles of the external toothing 41 and of the internal toothing 42. This motion generates an enveloping body which is used as the draw-off body for the external toothing 41. The internal toothing 42 serves virtually as a tool for producing the external toothing 41. Starting from the plane with the center M in which the tooth height is zero, that is, in which the tip circle and root circle of the external toothing 41 coincide and approximately equal $d_{11}$, the diameter of the root circle of the external toothing 41 decreases (and the tip circle increases) continuously in both directions of the axis $A_{11}$, that is, the tooth height as the difference between tip circle and root circle increases. The two partial zones of the external toothing 41 are not formed mirror-symmetrically to one another but, because of the preferred difference of one between the numbers of teeth of the internal toothing 42 and the external toothing 41, are arranged offset to one another by half a tooth-width in the circumferential direction of the axis $A_{11}$.

The two pitch circles of the external toothing 41, which each lie outside the external toothing 41 (that is, have larger diameters than the tip circle) are inclined with respect to the pitch circles of the internal toothing 42, for which reason the minimum eccentricity is smaller in comparison to toothings with axially constant tooth heights. In the region of the contact points $B_1$, $B_2$ a comparatively large tooth flank is available, for which reason the overall radial installation space required is reduced.

It will be understood by those skilled in the art that while the present invention has been discussed above with reference to an exemplary embodiment and modifications thereof, various additions, modifications and changes can be made thereto without departing from the spirit and scope of the invention as set forth in the claims.

That which is claimed:

1. A gear stage of an actuating drive that includes a driving mechanism, the gear stage comprising:
   fixed housing including a bearing defining an axis; and
   an oscillatory body defining an axis that is oblique to the axis of the bearing, the oscillatory body engaging the bearing at two contact points configured so that
      the oscillator body is for rolling on the bearing at the two contact points in response to rotation of the driving mechanism, and
      the oscillatory body rotates around both the axis of the bearing and the axis of the oscillatory body during the rolling of the oscillatory body on the bearing at the two contact points,
   wherein the bearing is configured so that the bearing is stationary with respect to the fixed housing during the rolling of the oscillatory body on the bearing at the two contact points.

2. The gear stage as claimed in claim 1, wherein the oscillatory body and the bearing cooperate as a friction gear.

3. The gear stage as claimed in claim 1, wherein the oscillatory body and the bearing cooperate by way of a toothing which comprises an external toothing and an internal toothing which mesh with one another.

4. The gear stage as claimed in claim 1, wherein during the rolling of the oscillatory body, the axis of the oscillatory body moves on a conical surface around the axis of the bearing.

5. The gear stage as claimed in claim 1 in combination with the driving mechanism, wherein the driving mechanism includes a rolling eccentric which moves the oscillatory body, and the rolling eccentric is generated by a circulatory rolling eccentric ball.

6. The gear stage as claimed in claim 1, wherein:
   the oscillatory body has a length that extends along the axis of the oscillatory body,
   the oscillatory body has a diameter that extends crosswise to the axis of the oscillatory body,
   the two contact points are spaced apart from one another along the length of the oscillatory body, and
   the two contact points are substantially diametrically opposite one another with respect to the diameter of the oscillatory body.

7. The gear stage as claimed in claim 1, wherein the oscillatory body has a conical receptacle for receiving an output drive.

8. The gear stage as claimed in claim 1, wherein:
   at least a portion of the oscillatory body is cylindrically symmetrical and has a diameter;
   at least a portion of the bearing is cylindrically symmetrical and has a diameter; and
   the diameter of the portion of the oscillatory body is different than the diameter of the portion of the bearing.

9. The gear stage as claimed in claim 8, wherein the rolling of the oscillatory body on the bearing around the axis of the bearing defines a rotating eccentricity of the oscillatory body that is small in comparison to both the diameter of the portion of the oscillatory body and the diameter of the portion of the bearing.

10. The gear stage as claimed in claim 9, wherein:
    the eccentricity is not more than a few percent of the diameter of the portion of the oscillatory body; and
    the eccentricity is not more than a few percent of the diameter of the portion of the bearing.

11. The gear stage as claimed in claim 1, wherein the axis of the oscillatory body intersects the axis of the bearing substantially at a center.

12. The gear stage as claimed in claim 11, wherein the center is arranged substantially midway between the contact points.

13. The gear stage as claimed in claim 1 in combination with the driving mechanism, wherein the driving mechanism comprises a motor, and the gear stage is integrated with the motor.

14. The combination as claimed in claim 13, wherein:
the oscillatory body carries rotor magnets of the motor, and
a stator cooperating with the rotor magnets is arranged on a housing which contains the bearing.

15. The gear stage as claimed in claim 1 in combination with both the driving mechanism, which is for driving the rolling of the oscillatory body on the bearing, and an output drive operatively connected to the oscillatory body for being driven by the rolling of the oscillatory body on the bearing, wherein the combination is the actuating drive.

16. The combination of claim 15 further in combination with a vehicle seat.

17. A gear stage of an actuating drive that includes a driving mechanism, the gear stage comprising:
a bearing defining an axis; and
an oscillatory body defining an axis that is oblique to the axis of the bearing, the osculatory body engaging the bearing at two contact points configured so that
the oscillatory body is for rolling on the bearing at the two contact points in response to rotation of the driving mechanism, and
the oscillatory body rotates around both the axis of the bearing and the axis of the oscillatory body during the rolling of the oscillatory body on the bearing at the two contact points,
wherein the oscillatory body has a conical receptacle for receiving an output drive;
a fixed housing;
the fixed housing including the bearing; and
the bearing being configured so that the bearing is stationary with respect to the fixed housing during the rolling of the oscillatory body on the bearing.

18. The gear stage as claimed in claim 17, wherein:
the axis of the oscillatory body intersects the axis of the bearing substantially at a center;
the receptacle has a narrowest point; and
at the narrowest point, the receptacle comprises a contact circle that encircles the center.

19. The gear stage as claimed in claim 17 in combination with the output drive, wherein the output drive is a shaft which engages the contact circle and has a cross section corresponding to the contact circle.

20. A gear stage of an actuating drive that includes a driving mechanism, the gear stage comprising:
a fixed housing including a bearing defining an axis; and
an oscillatory body defining an axis that is oblique to the axis of the bearing, the oscillatory body having an interior surface that extends around and along the axis of the oscillatory body to define a receptacle of the oscillatory body, the oscillatory body having a length that extends along the axis of the oscillatory body, the oscillatory body having a diameter that extends crosswise to the axis of the oscillatory body, and the oscillatory body engaging the bearing in a manner so that
the oscillator body is for rolling on the bearing at two contact points in response to rotation of the driving mechanism,
the oscillatory body rotates around both the axis of the bearing and the axis of the oscillatory body during the rolling of the oscillatory body on the bearing at the two contact points, and
the rolling of the oscillatory body on the bearing at the two contact points defines a rotating eccentricity of the oscillatory body,
wherein the oscillatory body engaging the bearing consists essentially of the oscillatory body engaging the bearing at the two contact points, and the two contact points are spaced apart from one another,
wherein each of the two contact points is adapted for circulating during the rolling of the oscillatory body on the bearing, and
wherein the bearing is configured so that the bearing is stationary with respect to the fixed housing during the rolling of the oscillatory body on the bearing at the two contact points.

21. The gear stage as claimed in claim 20, wherein the two contact points are spaced apart from one another along the length of the oscillatory body, and the two contact points are substantially diametrically opposite one another with respect to the diameter of the oscillatory body.

22. The gear stage as claimed in claim 21 wherein:
the receptacle of the oscillatory body is conical and for receiving an output drive,
the conical receptacle comprises a contact circle that encircles a center;
the axis of the oscillatory body intersects the axis of the bearing substantially at the center; and
the center is arranged substantially midway between the contact points.

* * * * *